United States Patent
Pascucci et al.

(10) Patent No.: US 11,847,070 B2
(45) Date of Patent: Dec. 19, 2023

(54) CREATING A COMPUTER MACRO

(71) Applicant: Société Civile "GALILEO 2011", Monaco (MC)

(72) Inventors: Antonio Pascucci, Seefeld (DE); Antonio De Donno, Nice (FR)

(73) Assignee: SOCIÉTÉ CIVILE "GALILEO 2011", Monaco (MC)

( * ) Notice: Subject to any disclaimer, the term of this patent is extended or adjusted under 35 U.S.C. 154(b) by 0 days.

(21) Appl. No.: 18/071,329

(22) Filed: Nov. 29, 2022

(65) Prior Publication Data

US 2023/0169018 A1 Jun. 1, 2023

(30) Foreign Application Priority Data

Nov. 30, 2021 (EP) ..................................... 21211259

(51) Int. Cl.
*G06F 13/10* (2006.01)
(52) U.S. Cl.
CPC ................................ *G06F 13/102* (2013.01)
(58) Field of Classification Search
None
See application file for complete search history.

(56) References Cited

U.S. PATENT DOCUMENTS

| | | |
|---|---|---|
| 2004/0243639 A1 | 12/2004 | Katz |
| 2005/0154999 A1 | 7/2005 | Wugoski |
| 2008/0092087 A1 | 4/2008 | Brown |

(Continued)

FOREIGN PATENT DOCUMENTS

WO 20150200537 A2 12/2015

OTHER PUBLICATIONS

European Search Report issued in connection with corresponding European Patent Application No. 21 21 1259 dated May 4, 2022.

*Primary Examiner* — Scott C Sun
(74) *Attorney, Agent, or Firm* — TAROLLI, SUNDHEIM, COVELL & TUMMINO L.L.P.

(57) ABSTRACT

A method for creating a computer macro, the computer macro being executed on a computer, the computer including a processor, a display screen, a peripheral device, and a memory accessible by the processor, peripheral device, the method comprising: detecting, by a computer driver being at least partially resident in the memory, a computer program being at least partially resident in the memory to be executed in the computer; assigning, by the computer driver, at least one computer macro relating to the detected computer program to a key and/or button on the peripheral device; assigning, by the computer driver, a computer macro symbol relating to the assigned computer macro; storing, in the memory, the computer macro, the key and/or button on the peripheral device assigned to the computer macro and/or the assigned computer macro symbol; displaying, on the display screen via the computer driver, an on-screen-display, OSD, wherein the OSD is configured to display the assigned stored computer macro symbol and a reference relating to the stored key and/or button on the peripheral device to which the assigned stored computer macro has been assigned; and executing, by the processor, the stored computer macro assigned to the stored computer macro in the computer program when the stored key and/or button on the peripheral device is actuated.

15 Claims, 5 Drawing Sheets

(56) References Cited

U.S. PATENT DOCUMENTS

| | | |
|---|---|---|
| 2010/0115159 A1 | 5/2010 | Cookson |
| 2013/0173896 A1 | 7/2013 | Parker |
| 2018/0121215 A1* | 5/2018 | Charbonneau ......... G16H 10/60 |
| 2018/0219553 A1* | 8/2018 | Casparian ............. H01F 7/0226 |

* cited by examiner

CREATING A COMPUTER MACRO

RELATED APPLICATIONS

The present invention is a U.S. Nonprovisional Patent Application claiming priority to European Patent Application No. 21211259.3, filed on Nov. 30, 2021; the entirety of which is hereby incorporated herein by reference.

TECHNICAL FIELD

The present solution generally relates to method for creating a computer macro. The method comprises the steps of: detecting a computer program; assigning at least one computer macro relating to the computer program to a key and/or button on a peripheral device; assigning a computer macro symbol relating to the computer macro; storing the key and/or button to which the computer macro and/or computer macro symbol has been assigned to; displaying the computer macro symbol and a reference to the key and/or button on an on-screen display; and executing the computer macro relating to the computer program when the key and/or button is actuated.

The present solution is defined in the claims. Relevant details are also to be found in the description and the drawings.

TECHNICAL BACKGROUND

WO 2015/200537 A2 discloses executing a computer program when a region of a touch-sensitive surface associated with a set of functionalities is contacted and, dependent on the context of the user interface at the time of contact, executing a function.

US 2004/243639 A1 discloses creating a task to be automatically performed on a computer by designating an executable function as the subject of a task, designating a trigger for the task that executes the function, designating a notification for the task when the task has been completed and associating the function, the trigger and the notification with a file in order to add behavior to the file by not modifying the file.

US 2013/173896 A1 discloses a method for generating a plurality of layout objects from first APIs in a source specification, collecting customization instructions in a customization object via second APIs, wherein each customization instruction includes predictates indicating applicability of the customization instruction, generating a presentation including the layout objects in response to an event, selectively applying the customization instructions from the customization object on the layout objects of the presentation to update the presentation according to the pre-dictates and displaying the updated presentation.

Furthermore, on a standard keyboard, function keys "F1" to "F12" maintain their macros independent of the computer program a user is using at that present moment. For example, "F1" opens the help/support window for the computer program, "F5" refreshes a web page, "F7" opens a spelling and grammar box in Microsoft Office programs and so on. There is not a possibility to alter the computer macros based on a user's preference nor alter the computer macro associated with a function key based on the computer program being used by the user.

SUMMARY

The present solution is set out in the independent claims. Preferred embodiments are outlined in the dependent claims.

According to a first aspect, a method for creating a computer macro is disclosed, the computer macro being executed on a computer, the computer including a processor, a display screen, a peripheral device, and a memory accessible by the processor. The method comprises detecting, by a computer driver being at least partially resident in the memory, a computer program being at least partially resident in the memory to be executed in the computer. The method further comprises assigning, by the computer driver, at least one computer macro relating to the detected computer program to a key and/or button on the peripheral device. The method further comprises assigning, by the computer driver, a computer macro symbol relating to the assigned computer macro. The method further comprises storing, in the memory, the computer macro, the key and/or button on the peripheral device assigned to the computer macro and/or the assigned computer macro symbol. The method further comprises displaying, on the display screen via the computer driver, an on-screen-display, OSD, wherein the OSD is configured to display the assigned stored computer macro symbol and a reference relating to the stored key and/or button on the peripheral device to which the assigned stored computer macro has been assigned. The method further comprises executing, by the processor, the stored computer macro assigned to the stored computer macro in the computer program when the stored key and/or button on the peripheral device is actuated.

A computer macro as used and understood herein stands for "macroinstruction" and is a programmable input command pattern which translates an activation of a specific key into a preset sequence of output (commands). Such macros make tasks less repetitive by representing a (complicated) sequence of keystrokes, mouse movements, commands, etc. which are executed by a single key stroke of the macro key.

A computer driver as used and understood herein is software that allows a computer to communicate with an internal or external computer hardware device, e.g. a peripheral device. Without drivers, the devices connected to the computer—for example, a mouse or external keyboard—will not work properly.

The present proposal allows for creating and customizing a computer macro based on a detected computer program, displaying a computer macro symbol associated with the computer macro and displaying a reference relating to the key and/or button on a peripheral device to which the computer macro has been assigned. This may result in a more efficient use of a computer program for a user due to the ability to create and customize computer macros based on the computer program being used and the easy readability of the keys to which the computer macros have been assigned, via a display screen.

The computer may be a laptop, a tablet computer, a desktop computer, a mobile phone or any other type of computer. The computer is Windows-based and/or Apple-based and/or Linux-based and/or based on any other suitable type of operating system. The processor may be configured to execute instructions stored in the memory. The display screen may be a commercially available display screen or a bespoke display screen. The peripheral device may be a commercially available peripheral device. Preferably, it is a bespoke peripheral device having dedicated macro keys as described herein.

A peripheral device as used and understood herein may refer to an auxiliary device coupled to a computer, such as a keyboard, a numeric keypad, a mouse, a bespoke peripheral device, a controller, a touchpad, a trackball, a joystick or any other suitable peripheral device. Throughout the present disclosure, any references made to a keyboard and/or a numeric keypad may be understood as referring to any other suitable peripheral device. The methods and systems described herein in relation to a keyboard and/or numeric keypad may also relate to any other suitable peripheral device, as described above. Throughout this present disclosure, a reference to a key on a peripheral device may also apply to a button on a peripheral device and vice versa.

In some examples, the computer driver is stored by the memory. The computer driver may be preinstalled on the memory or may be downloadable, and then storable by the memory, from the internet and/or from a USB stick and/or from a compact disk.

The computer program to be detected may be any program that is executable by the processor and/or a secondary processor of the computer. The computer program may be a file editor and/or a computer-aided drawing, CAD, program and/or an internet browser and/or a video game and/or a computer repair tool and/or any program executable by a processor on a computer.

The computer macro may be any suitable macro for the detected program. In a non-limiting example, in a file editor, a computer macro may be a text alignment, a bolding of a text element, a italicizing of a text element, an underlining of a text element, a highlighting of a text element or any other suitable macro. In a CAD program, the computer macro may be a selection of a line tool, a change of viewing perspective, a selection of a different page, a filling in of an element, a chamfering of an element or any other suitable macro. In some examples, a plurality of computer macros are assigned by the computer driver.

In some examples, the computer macro may change based on the program detected by the computer driver. In some examples, the computer macro may change based on the program which is in focus on the computer i.e. based on the computer program currently being used by a user. In a non-limiting example, if a file editor and a CAD program are both open on a computer at the same time, the computer macro may be a first computer macro when the file editor is being used by a user and the computer macro may be a second computer macro when the CAD program is being used by a user.

The computer macro symbol may be a symbol which is used to signify the computer macro. In a non-limiting example, if the computer macro is for a bolding of a text element, the computer macro symbol may be [B]. The computer macro symbol preferably relates to the computer macro in a way that is easy for a user to identify the computer macro based on the computer macro symbol. In some examples, a plurality of computer macro symbols may be assigned by the driver. In some examples, a plurality of computer macros may be assigned to a single computer macro symbol. In some examples, a plurality of computer macro symbols may be assigned to a computer macro. In some examples, each computer macro is assigned to a respective computer macro symbol.

The key and/or button on the peripheral device to which the computer macro is assigned may be any suitable key and/or button. In some examples, the key and/or button may be automatically assigned by the computer driver. In some examples, the key and/or button may be assignable by a user. In some examples, the key and/or button may relate to the assigned computer macro. In some examples, the key and/or button may have the computer macro symbol displayed upon it. In some examples, the key and/or button comprises a display screen which shows the assigned computer macro symbol for the computer macro which has been assigned to the key and/or button.

The OSD displays the assigned stored computer macro symbol and a reference to the macro key and/or button on the peripheral device to which the computer macro has been assigned. In a non-limiting example, if a macro for bolding a text element has been assigned to the "F1" key on a keyboard, the OSD may display the assigned computer macro symbol [F] and a reference to the "F1" key such as, for example, "F1". The reference may be a numerical reference and/or a text reference and/or a verbatim copy of the key and/or button to which the computer macro has been assigned. In some examples, the OSD is displayed in the form of a taskbar and/or a table and/or any other suitable method of displaying the OSD.

The processor is configured to execute the stored computer macro when the key and/or button assigned to the macro is actuated. This may allow for a more efficient use of a computer program for a user.

In some examples, the method further comprises displaying, on the screen via the computer driver, a configuration tool configured to display the assigned computer macro and/or the assigned computer macro symbol relating to the detected computer program, and the key and/or button on the peripheral device to which the computer macro is assigned, wherein the configuration tool is further configured to allow a user to alter the assigned computer macro and/or the assigned computer macro symbol and/or the key and/or button on the peripheral device to which the computer macro is assigned.

The configuration tool may allow a user to change the computer macro from an automatically assigned computer macro to a computer macro that may fit the user's preference in a more efficient manner. A user may be able to alter the computer macro from, for example, a computer macro of the bolding of a text element to a computer macro for underlining a text element. A user may also be able to alter the computer macro symbol assigned to the computer macro. The user may be able to alter the computer macro symbol to a symbol already present in the detected computer program. In some examples, the user may be able to alter the computer macro symbol to a symbol used in a computer program different from the detected computer program. in some examples, the user may be able to alter the computer macro symbol to a bespoke symbol such as, for example, a symbol downloaded from the internet and/or an alphanumeric element indicating the computer macro and/or a pre-stored image stored in the memory and/or any other suitable method of indicating the computer macro. The key and/or button on the peripheral device may be any key and/or button such as, for example, a function key, an alphanumeric key or a bespoke key on the peripheral device. In some examples, the configuration tool is configured to display a user interface configured to allow the user to select the computer macro and/or the computer macro symbol and/or the key and/or button on the peripheral device and alter the computer macro and/or computer macro symbol and/or key and/or button on the peripheral device according to the user's preferences.

In some examples, the key and/or button on the peripheral device is a key and/or button used only for the assigned computer macro. The key and/or button may be a separate key and/or button from the "standard" keys and/or buttons found on a peripheral device. The key and/or button may be placed above the "standard" function keys and/or buttons on the peripheral device and/or above the numerical keys and/or buttons on the peripheral device and/or above the alphabetical keys and/or buttons on the peripheral device and/or in any other suitable position. In some examples, the key used only for the assigned computer macro is a key on the "standard" keyboard such as, for example, the "F1" key. There may be any number of keys used only for the assigned computer macro. In some examples, when there are a plurality of computer macros, each computer macro may be assigned a respective key and/or button used only for the assigned computer macros.

In some examples, a plurality of computer macros are assigned to a key and/or button used only for the assigned computer macros. In some examples, a plurality of computer macro symbols are assigned to a key and/or button used only for the assigned computer macros. In some examples, a plurality of keys and/or buttons used only for the assigned computer macros may be assigned to a computer macro and/or a computer macro symbol. In some examples, the key and/or button on the peripheral device is a key and/or button separate from an existing function key or alphanumeric key or button on the peripheral device. This may allow for a more efficient use of the peripheral device due to customized computer macro key assignment.

In some examples, the computer program is at least one of:
a Microsoft Office program including MS Word, MS Excel, MS Powerpoint, and MS Access;
an Adobe program including Adobe Acrobat, Adobe Illustrator, Adobe Photoshop, and Adobe InDesign;
a computer-aided design, CAD, program including Auto-Cad, Pro-Engineer, Catia, Solidworks, and NX;
a Windows Pre-Installation Environment program including File Explorer, Calculator, Paint, and Photos; and
an Internet browser including Google Chrome, MS Edge, Mozilla Firefox, and Opera.

The above is not an exhaustive list and the computer programs may be expanded to computer programs outside the ones mentioned above.

In some examples, the computer driver may automatically assign computer macros and/or computer macro symbols and/or keys and/or buttons on the peripheral device to which the computer macros are assigned. This may allow for an easy and rapid setup of the peripheral device and/or the driver for the user with minimal input from the user.

In some examples, the computer macro symbol is a symbol used in the detected computer program for the assigned computer macro. This may allow for easy recognition of the compute macro to which the computer macro symbol has been assigned as the user may already be familiar with the computer macro symbol. In some examples, if the computer macro is altered, the computer driver automatically alters the computer macro symbol to a computer macro symbol related to the computer macro. In a non-limiting example, if the user alters the computer macro from a computer macro for bolding of a text element to a computer macro for underlining of a text element, the computer driver may automatically alter the computer macro symbol from [F] to [U]. In some examples, a user may be able to alter the computer macro symbol to a symbol which is not standard for the computer macro but is still within the detected program for the assigned computer macro. This allows for the user to alter the assignment of computer macro symbols to their preference, thereby allowing for a more efficient use of the peripheral device.

In some examples, the computer driver detects the computer program by the following steps:

detecting, by the computer driver, the executed computer program;
detecting, by the computer driver, the computer program in focus;
searching, by the computer driver, for a default/user mapping of the computer program in focus in a folder of the driver;
if the computer program in focus comprises a plugin for exporting a computer macro and a computer macro symbol relating to the computer program, executing, by the computer driver, the plugin and sending, by the plugin, the computer macro and the computer macro symbol to the computer driver;
creating, by the computer driver, at least two temporary files containing the computer macro and the computer macro symbol, wherein at least a first file comprises the computer macro and at least a second file comprises a reference to the computer macro symbol;
if a default/user mapping is found by the computer driver, searching, by the computer driver, for the at least two temporary files; and if the at least two temporary files are found, rendering, by a software component of the computer driver, the computer macro found in the default/user mapping.

In some examples, the OSD is a taskbar separate to a desktop taskbar. This may allow for the OSD taskbar to not interfere with the desktop taskbar, thereby allowing for an efficient use of the computer while still allowing for the OSD to be displayed.

In some examples, a position of the OSD on the display screen is to be determined and changed by a user. In some examples, the user may be able to drag and drop the OSD to a preferred position. For example, a user may wish for the OSD to be placed in a first location when the user is using a file editor and in a second location when the user is using a CAD program. In some examples, the OSD maintains its position until the user drags and drops the OSD into a different position. In some examples, the computer driver may offer preset positions of the OSD for the user to choose from. In some examples, the memory is configured to store a position of the OSD in each computer program. In some examples, the memory, the processor and the computer driver are configured to store, and then position, the OSD based on the previous position of the OSD in the detected computer program. In a non-limiting example, if the user drags and drops the OSD from a first position to a second position during use of a CAD program, when the user leaves the CAD program, the OSD returns to the first position. When the user then reopens the CAD program, the OSD is automatically moved back into the second position. This may allow for an efficient use of the OSD as the OSD can be moved into a position most suitable for the detected computer program.

In some examples, the OSD is integrated into a desktop taskbar.

In some examples, the OSD is further configured to display a computer program symbol relating to the detected computer program and/or the computer program to which the computer macro displayed on the OSD is assigned to. The computer program symbol may be a symbol that is used to indicate the currently detected computer program to the user. In some examples, the computer program symbol may be the symbol that is used on a computer desktop for the detected computer program. In some examples, the computer program symbol may be altered via the configuration tool in a manner similar to the computer macro and/or the computer macro symbol and/or the key on the keyboard and/or numerical keypad to which the computer macro has been assigned. This may allow for the user to easily see which computer program is detected, thereby allowing for an efficient use of the computer.

In some examples, the OSD is configured to display the stored key and/or button on the peripheral device and the assigned stored computer macro which has been assigned to the stored key and/or button. This may allow for the OSD to display a verbatim copy of the key and/or button to which the computer macro is assigned. In a non-limiting example, if the computer macro is assigned to the "F1" key, the OSD displays the term "F1" along with the computer macro symbol related to the computer macro assigned to the "F1" key. In some examples, the OSD is configured to display an alphanumeric text string relating to the stored key and/or button. This may allow for the user to easily see which key and/or button is assigned to which computer macro, thereby allowing for an efficient use of the computer.

In some examples, the OSD is configured to display the stored key and/or button on the peripheral device in a layout same to a layout of the stored key and/or button on the peripheral device as seen from a user's perspective. In a non-limiting example, if the keys and/or buttons on the peripheral device to which computer macros are assigned are in a 2×3 configuration, the OSD then displays the keys and/or buttons of the peripheral device in a 2×3 configuration. In some examples, the computer macro symbols relating to the computer macros are also displayed in the same 2×3 configuration. The keys and/or buttons on the peripheral device may be laid out in any suitable manner. This may allow for the user to easily identify which computer macros are assigned to each key and/or button, thereby allowing for an efficient use of the computer.

In some examples, the method comprises: assigning, by the computer driver, a plurality of computer macros; assigning, by the computer driver, a plurality of computer macro symbols relating to the plurality of computer macros; storing, in the memory, the plurality of the computer macros, a plurality of keys and/or buttons on the peripheral device assigned to the plurality of computer macros and/or the plurality of assigned computer macro symbols; and displaying, on the display screen via the computer driver, the OSD, wherein the OSD is configured to display the plurality of assigned stored computer macro symbols and a plurality of references relating to the plurality of stored keys and/or buttons on the peripheral device to which the plurality of assigned stored computer macros have been assigned. The computer macros and/or computer macro symbols and/or keys and/or buttons on the peripheral device may be assigned and stored in a manner similar to the manner described above. This may allow for a plurality of computer macros and computer macro symbols to be assigned on a single peripheral device. This may in turn allow for a greater range of customizable computer macros as multiple computer macros can be used at the same time. As a plurality of computer macros can be used at the same time, this may allow for a more efficient use of the computer by a user.

In some examples of the present disclosure, a plurality of keys and/or buttons is described. In some examples, there may be a plurality of keys and a single button. In some examples, there may be a plurality of buttons and a single key.

In some examples, the OSD is configured to display the plurality of assigned stored computer macro symbols and the plurality of references relating to the plurality of stored keys and/or buttons on the peripheral device to which the plurality of assigned stored computer macros have been assigned in groups, wherein the groups relate to the layout of the plurality of the stored keys and/or buttons on the peripheral device as seen from a user's perspective. In a non-limiting example, if the keys and/or buttons on the peripheral device to which computer macros and the computer macro symbols are assigned are in groups of four, the OSD then displays the keys and/or buttons of the peripheral device and the computer macro symbols relating to the computer macros which are assigned to the respective keys and/or buttons of the peripheral device in groups of four. This may allow for the user to easily identify which computer macros are assigned to each key and/or button, thereby allowing for a more efficient use of the computer.

In some examples, wherein the peripheral device is a keyboard and/or numeric keypad, there are twelve assigned stored computer macro symbols and twelve references relating to the twelve stored keys on the keyboard and/or the numeric keypad to which the twelve assigned stored computer macros, and wherein the twelve assigned stored computer macro symbols and twelve references are configured to be displayed on the OSD in three groups of four. In some examples, the twelve keys relate to the twelve "standard" function buttons found on a keyboard. In some examples, the twelve stored keys are keys used only for the assigned computer macros, as described above. In some examples, a mix of "standard" function keys and keys used only for the assigned computer macros are within the twelve keys. This layout may allow for the use of a plurality of customizable macros, thereby allowing for an efficient use of the computer. Furthermore, the use of keys used only for the assigned computer macros may allow for an expanded use of the keyboard and/or numerical keypad as the "standard" keys of the keyboard and/or numerical keypad are not assigned to computer macros. In some examples, there are any number of assigned stored computer macro symbols and/or any number of references relating to the stored keys on the keyboard and/or the numeric keypad and/or any number of assigned stored computer macros.

In some particular examples, the OSD is configured to display a thirteenth computer macro symbol, wherein the thirteenth computer program symbol relates to the detected computer program and/or the computer program to which the computer macro displayed on the OSD is assigned to. This may be equivalent to the computer program symbol as described above. The computer macro symbol is described here, as a thirteenth symbol but it may alternatively be any numbered symbol.

In some alternative examples, wherein the peripheral device is a keyboard and/or numeric keypad, there are four assigned stored computer macro symbols and four references relating to the four stored keys on the keyboard and/or the numeric keypad to which the four assigned stored computer macros, and wherein the four assigned stored computer macro symbols and four references are configured to be displayed on the OSD in one group of four. The position and function of the keys may be the same as described above.

In some particular examples, the OSD is configured to display a fifth computer macro symbol, wherein the fifth computer program symbol relates to the detected computer program and/or the computer program to which the computer macro displayed on the OSD is assigned to. This may be equivalent to the computer program symbol as described above. The computer macro symbol is described here, as a fifth symbol but it may alternatively be any numbered symbol.

In some alternative examples, there is a plurality of peripheral devices comprising at least a keyboard and a numeric keypad, wherein there are sixteen assigned stored computer macro symbols and sixteen references relating to the sixteen stored keys on the keyboard and/or the numeric keypad to which the sixteen assigned stored computer macros, and wherein the sixteen assigned stored computer macro symbols and sixteen references are configured to be displayed on the OSD in four groups of four. The sixteen assigned stored macro symbols and references relating to sixteen stored keys may be a combination of the above-mentioned examples.

In some particular examples, the OSD is configured to display a seventeenth computer macro symbol, wherein the seventeenth computer program symbol relates to the detected computer program and/or the computer program to which the computer macro displayed on the OSD is assigned to. This may be equivalent to the computer program symbol as described above. The computer macro symbol is described here, as a seventeenth symbol but it may alternatively be any numbered symbol.

In some examples, the assigned computer macro is unique to the detected computer program. In some examples, the computer macro may only be used in the detected computer program and no other computer programs detectable by the computer driver. The use of unique computer macros may allow for the use of specialist computer programs, thereby allowing for the method to be used in specialized fields.

According to a second aspect, we describe a computer program comprising a computer driver for creating a computer macro, wherein the computer product comprises instructions which, when the program is carried out by a computer, cause the computer to carry out: detecting a computer program; assigning a computer macro relating to the computer program to a key and/or button on a peripheral device; assigning a computer macro symbol relating to the assigned computer macro; and displaying, on a screen, an on screen display, OSD, configured to display the assigned computer macro symbol and a reference to the key and/or button on the peripheral device to which the assigned computer macro has been assigned.

The computer may be a laptop, a tablet computer, a desktop computer or any other type of computer. The computer may be Windows-based and/or Apple-based and/or Linux-based and/or based on any other suitable type of operating system. The processor may be configured to execute instructions stored by the memory. The display screen may be a commercially available display screen or a bespoke display screen. The keyboard and/or numeric keypad may be a commercially available keyboard and/or numeric keypad or may be a bespoke keyboard and/or numeric keypad.

The computer program to be detected may be any program that is executable by a processor of a computer. The computer program may be a file editor and/or a computer-aided drawing, CAD, program and/or an internet browser and/or a video game and/or a computer repair tool and/or any program executable by a processor on a computer.

The computer macro may be any suitable macro for the detected program. In a non-limiting example, in a file editor, a computer macro may be a text alignment, a bolding of a text element, a italicizing of a text element, an underlining of a text element, a highlighting of a text element or any other suitable macro. In a CAD program, the computer macro may be a selection of a line tool, a change of viewing perspective, a selection of a different page a filling in of an element, a chamfering of an element or any other suitable macro. In some examples, a plurality of computer macros are assigned by the computer driver.

In some examples, the computer macro may change based on the program detected by the computer driver. In some examples, the computer macro may change based on the program which is in focus on the computer i.e. based on the computer program currently being used by a user. In a non-limiting example, if a file editor and a CAD program are both open on a computer at the same time, the computer macro may be a first macro when the file editor is being used by a user and the computer macro may be a second computer macro when the CAD program is being used by a user.

The computer macro symbol may be a symbol which is used to signify the computer macro. In a non-limiting example, if the computer macro is for a bolding of a text element, the computer macro symbol may be [F]. The computer macro symbol preferably relates to the computer macro in a way that is easy for a user to identify the computer macro based on the computer macro symbol. In some examples, a plurality of computer macro symbols may be assigned by the driver. In some examples, a plurality of computer macros may be assigned to a single computer macro symbol. In some examples, a plurality of computer macro symbols may be assigned to a computer macro. In some examples, each computer macro is assigned to a respective computer macro symbol.

The key and/or button on the peripheral device to which the computer macro is assigned may be any suitable key and/or button. In some examples, the key and/or button may be automatically assigned by the computer driver. In some examples, the key and/or button may be assignable by a user. In some examples, the key and/or button may relate to the assigned computer macro. In some examples, the key and/or button may have the computer macro symbol displayed upon it. In some examples, the key and/or button comprises a display screen which shows the assigned computer macro symbol for the computer macro which has been assigned to the key.

The OSD displays the assigned stored computer macro symbol and a reference to the key and/or button on the peripheral device to which the computer macro has been assigned. In a non-limiting example, if a macro for bolding a text element has been assigned to the "F1" key on a keyboard, the OSD may display the assigned computer macro symbol [B] and a reference to the "F1" key such as, for example, "F1". The reference may be a numerical reference and/or a text reference and/or a verbatim copy of the key and/or button to which the computer macro has been assigned. In some examples, the OSD is displayed in the form of a taskbar and/or a table and/or any other suitable method of displaying the OSD.

In some examples, the computer program is further configured to display, on the screen, a configuration tool, wherein the configuration tool is configured to display the assigned computer macro and/or the assigned computer macro symbol, and the key and/or button on the peripheral device to which the computer macro is assigned, wherein the configuration tool is further configured to allow a user to alter the assigned computer macro and/or the assigned computer macro symbol and/or the key and/or button on the peripheral device to which the computer macro is assigned.

The configuration tool may allow for a user to change the computer macro from an automatically assigned computer macro to a computer macro which may fit the user's preference in a more efficient manner. A user may be able to alter the computer macro from, for example, a computer macro of the bolding of a text element to a computer macro for underlining a text element. A user may also be able to alter the computer macro symbol assigned to the computer macro. The user may be able to alter the computer macro symbol to a symbol already present in the detected computer program. In some examples, the user may be able to alter the computer macro symbol to a symbol used in a computer program different from the detected computer program. In some examples, the user may be able to alter the computer macro symbol to a bespoke symbol such as, for example, a symbol downloaded from the internet and/or an alphanumeric element indicating the computer macro and/or a pre-stored image stored in the memory and/or any other suitable method of indicating the computer macro. The key on the keyboard and/or numerical keypad may be any key such as, for example, a function key, an alphanumeric key or a bespoke key on the keyboard and/or numerical keypad. In some examples, the configuration tool is configured to display a user interface configured to allow the user to select the computer macro and/or the computer macro symbol and/or the key on the keyboard and/or numerical keypad and alter the computer macro and/or computer macro symbol and/or key on the keyboard and/or numerical keypad according to the user's preferences.

In some examples, the computer macro symbol is a symbol used in the detected computer program for the assigned computer macro. This may allow for easy recognition of the computer macro to which the computer macro symbol has been assigned as the user may already be familiar with the computer macro symbol. In some examples, if the computer macro is altered, the computer driver automatically alters the computer macro symbol to a computer macro symbol related to the computer macro. In a non-limiting example, if the user alters the computer macro from a computer macro for bolding of a text element to a computer macro for underlining of a text element, the computer driver may automatically alter the computer macro symbol from [B] to [U]. In some examples, a user may be able to alter the computer macro symbol to a symbol which is not standard for the computer macro but is still within the detected program for the assigned computer macro. This may allow for the user to alter the assignment of computer macro symbols to their preference, thereby allowing for a more efficient use of the keyboard and/or numeric keypad.

In some examples, the computer driver is configured to detect the computer program by the following steps:

detecting, by the computer driver, the executed computer program;

detecting, by the computer driver, the computer program in focus; searching, by the computer driver, for a default/user mapping of the computer program in focus in a folder of the driver;

if the computer program in focus comprises a plugin for exporting a computer macro and a computer macro symbol relating to the computer program, executing, by the computer driver, the plugin and sending, by the plugin, the computer macro and the computer macro symbol to the computer driver;

creating, by the computer driver, at least two temporary files containing the computer macro and the computer macro symbol, wherein at least a first file comprises the computer macro and at least a second file comprises a reference to the computer macro symbol;

if a default/user mapping is found by the computer driver, searching, by the computer driver, for the at least two temporary files; and if the at least two temporary files are found, rendering, by a software component of the computer driver, the computer macro found in the default/user mapping.

According to a third aspect, we describe a computer macro creation system comprising: a computer driver configured to carry out the method as disclosed above; and a peripheral device.

The peripheral device may be a commercially available peripheral device or may be a bespoke peripheral device.

In some examples, the memory and processor are configured to periodically communicate with a cloud storage medium and store the key and/or button on the peripheral device assigned to the computer macro and/or the assigned computer macro symbol and/or the computer macro and/or the assigned computer macro symbol themselves in the cloud storage medium. This may allow for the assigned computer macros, the assigned computer macro symbols and the keys and/or buttons of the peripheral device to which the computer macros and computer macro symbols are assigned to be stored in the cloud, thereby allowing for the assignments to be maintained if the peripheral device is transferred to a second computer. This may allow for a user to maintain their created and customized computer macros across devices. The user may access the cloud stored computer macros, computer macro symbols and keys and/or buttons via a user account on a website. The computer driver and/or processor and/or memory may also be coupled to this same account for easy storage and/or retrieval of the computer macros, computer macro symbols and keys and/or buttons on a second computer.

According to a fourth aspect, we describe a data processing system comprising means for carrying out the method as described above.

According to a fifth aspect, we describe a computer-readable storage medium comprising instructions which, when executed by a computer, cause the computer to carry out the method as described above.

Throughout the present disclosure, in some examples, not all of the described steps of the described methods are required. In some examples, the steps may be in a different order. In some examples, some of the steps may happen simultaneously.

It is clear to a person skilled in the art that the statements set forth herein may be implemented under use of hardware circuits, software means, or a combination thereof. The software means can be related to programmed microprocessors or a general computer, an ASIC (Application Specific Integrated Circuit) and/or DSPs (Digital Signal Processors). For example, the processor may be implemented at least partially as a computer, a logical circuit, an FPGA (Field Programmable Gate Array), a processor (for example, a microprocessor, microcontroller (μC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP.

Even if some of the features described above have been described in reference to the first aspect, these features may also be in reference to any of the second to fifth aspects and vice versa. These aspects may also apply to devices, methods and systems for creating a computer macro.

BRIEF DESCRIPTION OF THE DRAWINGS

These and other aspects of the solution will now be further described, by way of example only, with reference to the accompanying figures, wherein like reference numerals refer to like parts, and in which.

DETAILED DESCRIPTION OF THE SOLUTION

Throughout the present disclosure, reference is made to a Windows operating system. The described solution may also be suitable for an Apple operating system and/or a Linux operating system and/or any other type of operating system. Features described in the present disclosure with relation to a Windows operating system can be realized with their equivalents in other operating systems.

Figure 1:
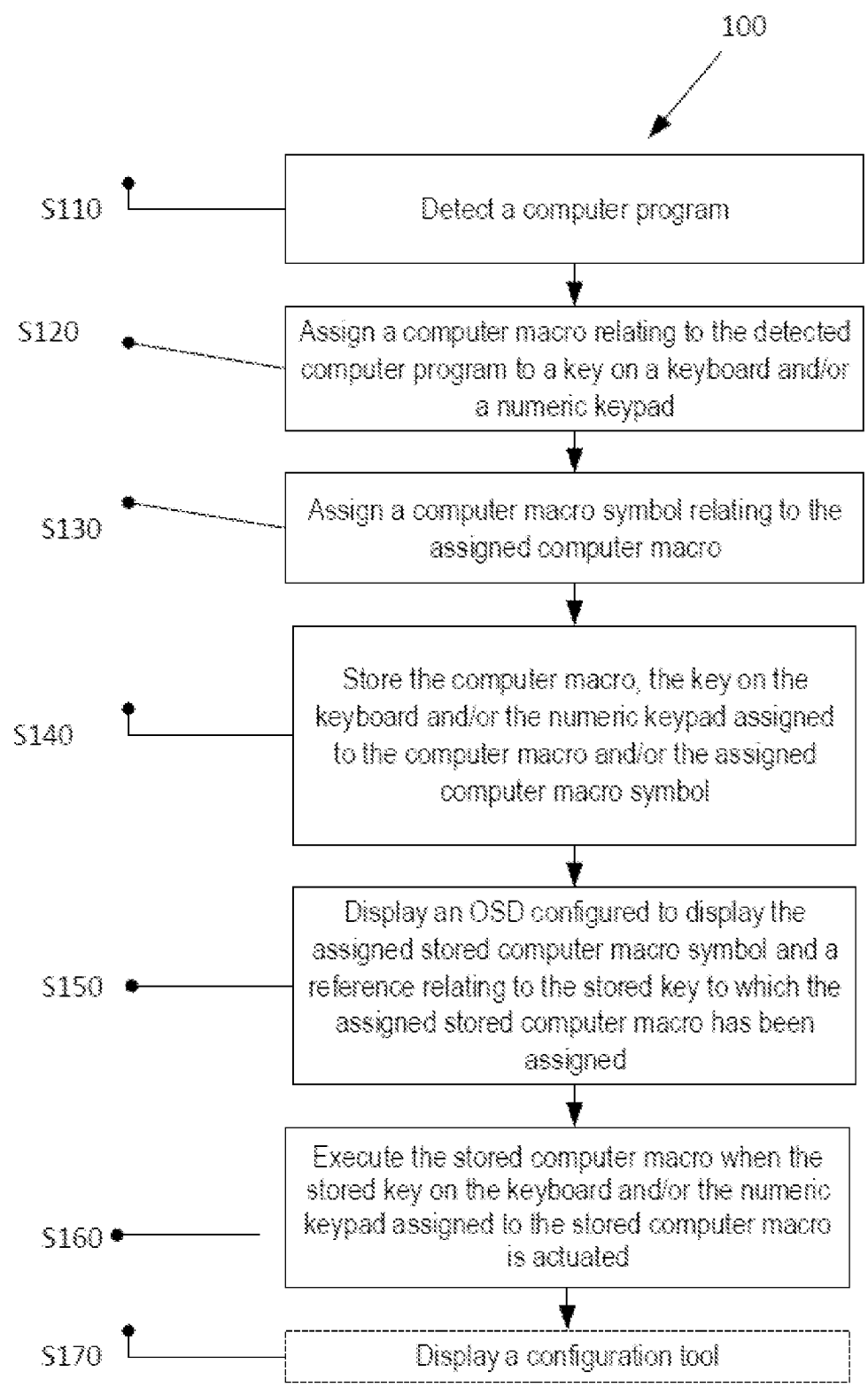
FIG. 1 shows a flow diagram of a method of creating computer macros and displaying computer macros on a display screen according to some examples as described herein.

FIG. 1 shows a flow diagram of a method of creating computer macros and displaying computer macros on a display screen according to some examples as described herein.

Figure 3:
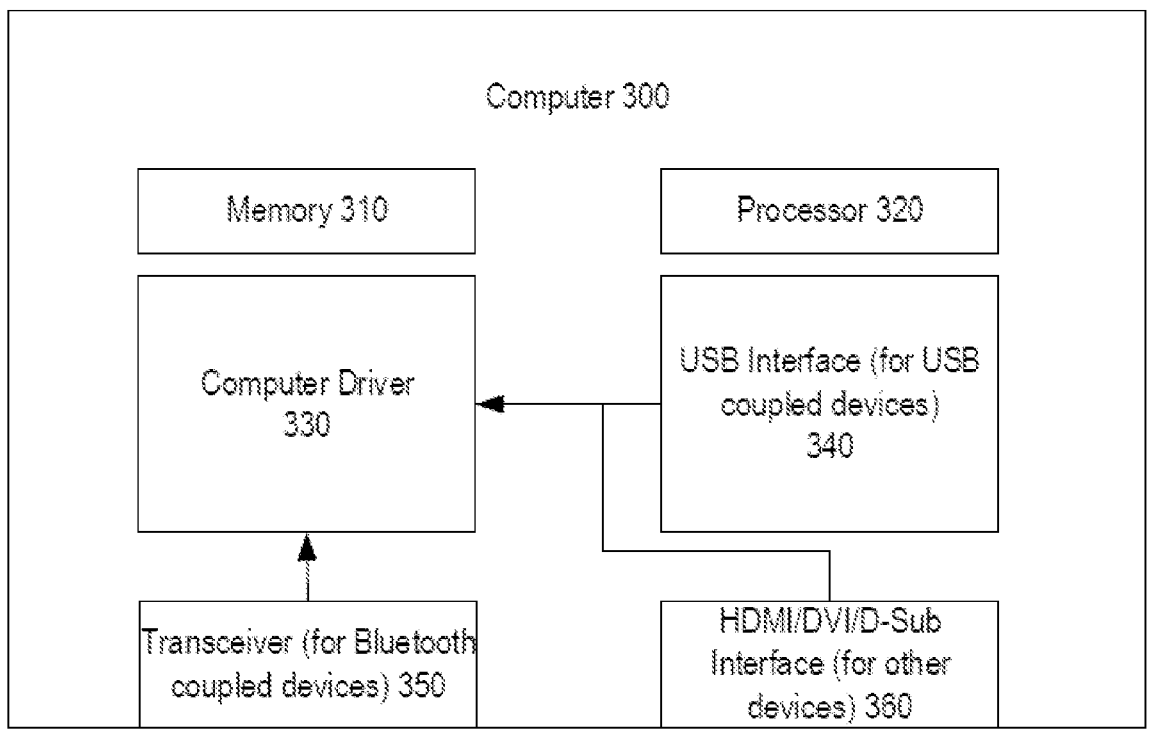
FIG. 3 shows a schematic diagram of a computer according to some examples as described herein.

The method 100 begins by detecting S110, by a computer driver being at least partially resident in the memory (see FIG. 3), a computer program being at least partially resident in the memory to be executed in a computer (see FIG. 3). The computer program may be any suitable computer program for which computer macros can be assigned to. The computer program may alternatively or additionally be a computer program which is at least partially executable by a processor (see FIG. 3). In some examples, the computer program is not partially resident in the memory, but is still at least partially executable by the processor. In some examples, the detectable computer program is a file editor and/or a computer aided drawing, CAD, program and/or an Internet browser and/or video game and/or a computer repair tool and/or any program executable by a processor on a computer. In some examples, the computer program is a computer program which is in development, in its alpha phase or in its beta phase. A method of detecting a computer program is described in more detail below.

After detecting S110 the computer program, the computer driver then assigns S120 at least one computer macro relating to the detected computer program to a key on the keyboard and/or numeric keypad. The assigned key may be any key on the keyboard and/or numeric keypad. In some examples, the key may be at least one of the "F1" to "F12" keys on a standard keyboard. In some examples, the assigned key is one of the standard keys on a numeric keypad. In some examples, the assigned key is one of the other keys which are located on a standard keyboard such as, for example, the control key, the Alt key, the tab key or any other key on the keyboard. In some examples, the assigned key is a bespoke key on the keyboard and/or numeric keypad. In some examples, the bespoke key is placed above the row of function keys on a standard keyboard. Additionally or alternatively, the bespoke key is placed above the standard keys on the numeric keypad. In some examples, there are a plurality of bespoke keys on the keyboard and/or numeric keypad. In some examples, there is a row of bespoke keys above the row of function keys on a standard keyboard. Additionally or alternatively, there is a row of bespoke keys above the standard keys on the numeric keypad. In some examples, the bespoke key is only used for the at least one computer macro.

After assigning S120 the computer macro to the key on the keyboard and/or numeric keypad, the computer driver then assigns S130 a computer macro symbol relating to the assigned computer macro. The computer macro symbol may relate to the computer macro. In some examples, the computer macro symbol is a symbol which already exists in the detected computer program. In this case, the computer driver may then assign this computer macro symbol to the computer macro. In a non-limiting example, if the assigned computer macro is a macro for centering a line of text in Microsoft Word, the computer driver may then assign the center text symbol of Microsoft Word to the computer macro. In some examples, the assigned computer macro symbol is a symbol that exists in the detected computer program but is not the symbol associated with the assigned computer macro. In a non-limiting example, if the assigned computer macro is a macro for centering a line of text in Microsoft Word, the computer driver may assign the highlighting symbol within Microsoft Word to the computer macro. In some examples, the computer macro symbol is not a symbol that is available within the detected computer program but is available in a secondary non-detected computer program. In some examples, if a computer macro is recognized by the computer driver but no computer macro symbol can be assigned for the computer macro, the computer driver may automatically insert a placeholder computer macro symbol. In some examples, after the placeholder computer macro symbol has been inserted, the user may be able to customize the computer macro symbol, as described in the present disclosure. In some examples, no placeholder computer macro symbol is inserted and the user is directly asked as to which computer macro symbol should be assigned to the computer macro. In some examples, the assigned computer macro symbol may be a symbol or a picture that is downloaded from the Internet and is at least partially storable within the memory of the computer. In some examples, the computer macro symbol may be an alphanumeric text string. This may allow for a user to customize their experience.

After assigning S130 the computer macro symbol to the computer macro, the key on the keyboard and/or numeric keypad which is assigned to the computer macro and/or the assigned computer macro symbol is stored S140 in the memory of the computer. This may then allow for the computer macro and/or computer macro symbol and/or key to which the computer macro is assigned, to be stored for later use. In some examples, if a user of the computer changes programs from a first computer program to a second computer program, the memory may store the computer macro and/or the computer macro symbol and/or the key to which the computer macro is assigned. This may mean that when the user comes back to use the first program, the settings are not lost and the user does not have to reassign the computer macro and/or computer macro symbol and/or key to which the computer macro is assigned.

After storing S140 the computer macro and/or the computer macro symbol and/or the key to which the computer macro is assigned, the computer driver then displays S150, via a display screen, an on screen display, OSD, which is configured to display the stored computer macro symbol and a reference relating to the key on the keyboard and/or numeric keypad to which the computer macro has been assigned. As described above, the key on the keyboard and/or numeric keypad may be any key on the keyboard and/or numeric keypad and/or a bespoke key on the keyboard and/or numeric keypad. By displaying the computer macro symbol and the reference relating to the key on the keyboard and/or numeric keypad to which the computer macro has been assigned, this may allow the user to easily recognize which computer macro has been assigned to which key. A method of displaying the computer macro symbol and the reference to the key to which the computer macro has been assigned is described in more detail below.

Once the on-screen display has been displayed S150, the processor executes S160 the computer macro assigned to the stored computer macro in the detected computer program when the key on the keyboard and/or numeric keypad assigned to the computer macro is actuated. This may allow for the user to efficiently use the detected computer program.

In some examples, the computer driver is configured to display S170 configuration tool via the display screen. The configuration tool is described in more detail below.

The above method, and the methods in the present disclosure, relate to a keyboard and/or a numeric keypad but may additionally or alternatively relate to any suitable peripheral device such as, for example, a mouse, a bespoke peripheral device, a controller, a touchpad, a trackball, a joystick or any other suitable peripheral device.

Figure 2:
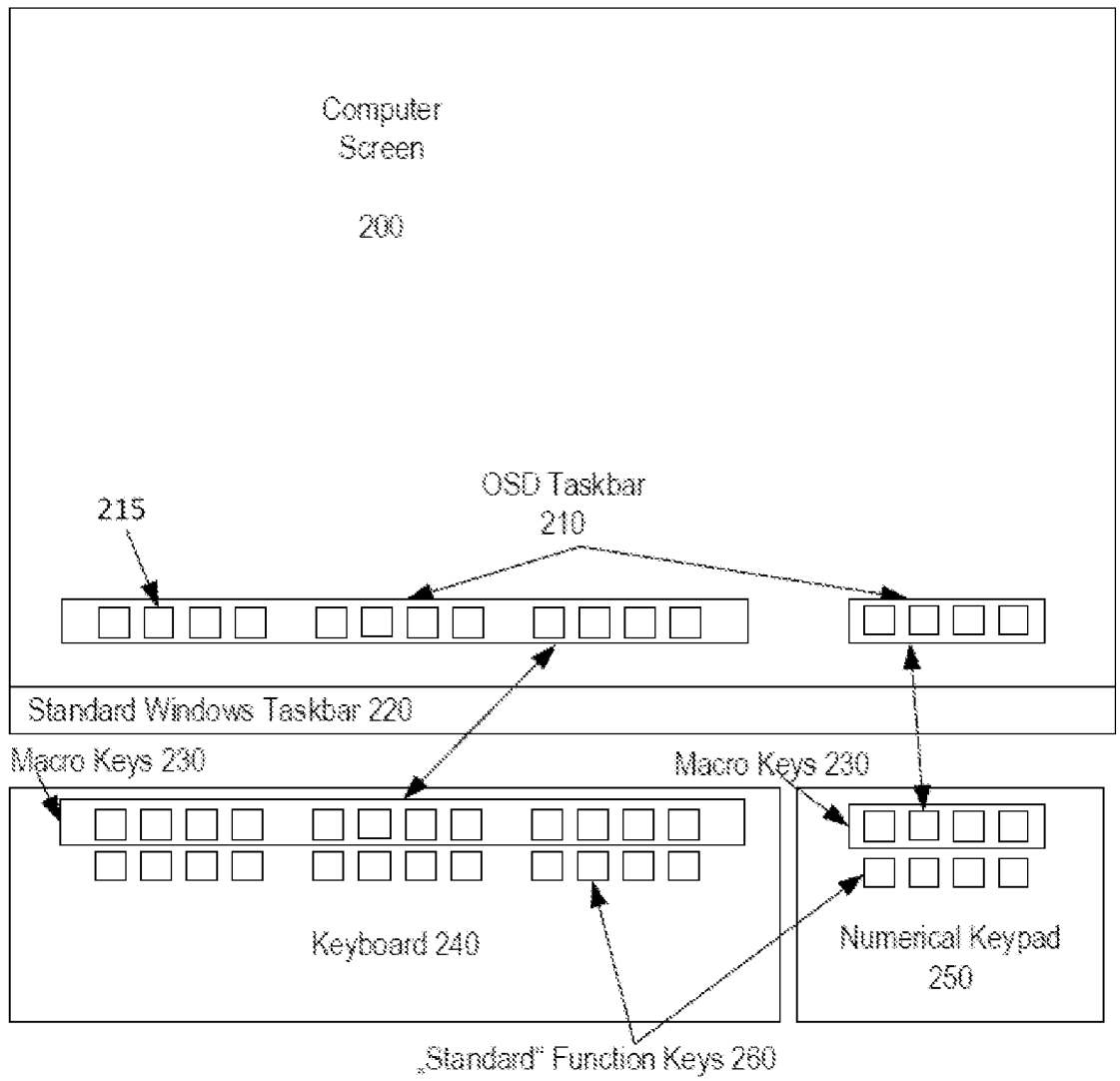
FIG. 2 shows a schematic diagram of a display screen and peripheral devices according to some examples as described herein.

FIG. 2 shows a schematic diagram of a display screen and peripheral devices according to some examples as described herein.

In this example, the display screen is a computer screen 200. In some examples, the computer screen may alternatively be a monitor, a laptop screen, a tablet computer screen, a mobile phone screen or any other type of screen that is suitable for displaying images. The computer screen 200 may be a commercially available computer screen or a bespoke computer screen.

On the computer screen 200, the computer driver, via the computer screen 200, displays an OSD taskbar 210. The OSD taskbar 210 is configured to display the computer macro symbols 215 that have been assigned to the computer macros by the computer driver, as described in the present disclosure. It can be seen that the computer macro symbols 215 on the OSD taskbar 210 have been split up into groups of four and the OSD taskbar 210 itself, has been split into two parts. The purpose of this will be described in more detail below.

In this example, the OSD taskbar 210 is located above the standard Windows taskbar 220. This may then allow for a user to move the OSD taskbar 210 according to their wishes dependent on the computer program the user is currently using. In some examples, the OSD taskbar 210 is integrated into the standard Windows taskbar 220. This may allow for a user to easily find the OSD taskbar 210 and/or allow for the OSD taskbar 210 to be integrated into a desired computer program. In some examples, the user may decide to have the OSD taskbar 210 separate from the standard Windows taskbar 220 when using some computer programs and have the OSD taskbar 210 integrated into the standard Windows taskbar 220 when using other computer programs. In this example, the memory may store these choices and when the user uses a computer program, the memory, the processor of the computer and the computer driver may work together to display the stored choice for the computer program on the computer screen 200.

In some examples, the OSD taskbar 210 is movable by a user. The user may be able to alter the positioning of the OSD taskbar 210 via a configuration tool and/or via dragging and dropping the OSD taskbar 210 and/or via coding and/or via any other suitable method. In some examples, the memory of the computer is configured to store a position of the OSD taskbar 210 in each computer program. In some examples, the memory, the processor and the computer driver are configured to store, and then position, the OSD taskbar 210 based on the previous position of the OSD taskbar 210 in the detected computer program. For example, if the user drags and drops the OSD taskbar 210 from a first position to a second position during use of a first computer program, when the user leaves the first computer program and uses a second computer program, the OSD taskbar 210 returns to the first position. When the user then reopens the first computer program, the OSD taskbar 210 is automatically moved back into the second position i.e. the position to which the OSD taskbar 210 was dragged and dropped to. This may allow for an efficient use of the OSD taskbar 210 as the OSD taskbar 210 can be moved into a position most suitable for the detected computer program.

In this example, there are a plurality of macro keys 230 located on the keyboard 240 and the numerical keypad 250. In some examples, the macro keys 230 are only on the keyboard 240 or the numerical keypad 250. In some examples, there is only a keyboard 240 or only a numerical keypad 250. In some examples, the keyboard 240 and the numeric keypad 250 are a single entity. In some examples, the keyboard 240 and/or numeric keypad 250 may be a commercially available keyboard 240 and/or numeric keypad 250, or may be a bespoke keyboard 240 and/or numeric keypad 250. In this example, the OSD taskbar 210 displays the computer macro symbols 215 which are assigned to the computer macros in a way that reflects the macro keys 230 on the keyboard 240 and numerical keypad 250. It can be seen that there are twelve macro keys on the keyboard 240 split into three groups of four and a fourth set of four macro keys on the numerical keypad 250. These groupings are then shown on the computer screen 200, via the OSD taskbar 210 in the same way as they are displayed on the keyboard 240 and the numeric keypad 250. In particular, a first part of the OSD taskbar 210 displays three groups of four computer macro symbols 215 relating to the three groups of four macro keys on the keyboard 240 and a second part of the OSD taskbar displays a group of four computer macro symbols 215 which relate to the macro keys 230 on the numeric keypad 250. In some examples, the two parts of the OSD taskbar 210 may be merged and form a single OSD taskbar 210. In some examples, the layout of the computer macro symbols 215 on the OSD taskbar does not relate to the layout of the macro keys 230 on the keyboard 240 and numerical keypad 250. In some examples, the OSD taskbar 210 further comprises an alphanumeric text string relating to the key on the keyboard 240 and/or numeric keypad 250 to which the computer macro and its respective symbol 215 have been assigned. In some examples, a layout of the computer macro symbols 215 in the OSD taskbar 210 can be altered by a user. The user may be able to alter this positioning via a configuration tool and/or via dragging and dropping the computer macro symbols 215 and/or via coding and/or via any other suitable method. In some examples, the OSD taskbar 210 is further configured to display a symbol relating to the detected computer program. In this case, the OSD taskbar 210 may display a symbol that is used on a computer desktop for the detected computer program.

In some examples, there is a plurality of computer screens 200. In this case, the OSD taskbar 210 may be configured to be stretched across the plurality of computer screens 200. For example, if there are sixteen computer macro symbols 215 displayed on the OSD taskbar 210 and there are two computer screens 200, the computer driver may, via the computer screen 200, display a first eight computer macro symbols on the first screen and a second eight computer macro symbols 215 on the second screen in a single OSD taskbar 210 shown across both computer screens 200. This may mean that the OSD taskbar 210 is only interrupted by the frames of the computer screens 200. In some examples, if the OSD taskbar 210 is placed at the edge of one of the computer screens 200, a part of the OSD taskbar 210 can be seen on the first screen and the remainder of the OSD taskbar 210 can be seen on the second screen. That is to say, the dimensions of the OSD taskbar 210 remain the same but the OSD taskbar 210 is shared across two computer screens 200. Alternatively, the entire OSD taskbar 210 may be repeated on each computer screen. Alternatively, there may only be a single OSD taskbar 210 across the plurality of computer screens 200 and the position of the OSD taskbar 210 may be altered via a configuration tool and/or via dragging and dropping the OSD taskbar 210 and/or via coding and/or via any other suitable method across the plurality of computer screens 200. In some examples, the OSD is not in the form of a taskbar 210 but may be in the form of a table, an OSD region, or any other suitable method of displaying the computer macro symbols 215 according to a user's preference.

In this example, the macro keys 230 on the keyboard 240 and the numeric keypad 250 are located above the standard function keys 260. A standard function key may be defined as, for example, keys "F1" to "F12" on a standard keyboard. This may allow for the macro keys 230 to be easily identifiable by a user of the keyboard 240 and numerical keypad 250. It can be seen in FIG. 2 that the macro keys 230 are distinct and separate to the standard function keys 260 found on the keyboard 240 and/or the numeric keypad 250.

It is known to have the standard function keys 260 which are fixed in their usage and the computer macros assigned to the standard function keys 260 cannot be altered by a user. In this example, the macro keys 230 are used only for the computer macros as described throughout the present disclosure, and the computer macros assigned to the macro keys 230 can be altered dependent on the detected computer program, as is described in more detail below.

FIG. 3 shows a schematic diagram of a computer according to some examples as described herein.

FIG. 3 shows a computer 300. The computer 300 may be a desktop computer, a tablet computer, electronic components within a mobile phone or any other suitable device which is suitable for carrying out the methods described in the present disclosure.

The computer comprises a memory 310, a processor 320 and a computer driver 330.

In this example, the memory 310 is configured to be accessible by the processor 320. In some examples, the computer driver 330 is at least partially resident in the memory 310. In some examples, the computer program used by the user is at least partially resident in the memory 310. In some examples, the memory 310 is configured to store the computer macro, the key on the keyboard 240 and/or the numeric keypad 250 assigned to the computer macro and/or the assigned computer macro symbol 215. In some examples, the computer driver 330 is stored by the memory 310. The computer driver 330 may be preinstalled on the memory 310 or may be downloadable, and then storable by the memory 310, from the internet and/or from a compact disk and/or a USB stick and/or from any other suitable source. In some examples, the memory 310 is located in the keyboard 240 and/or numeric keypad 250 and not in the computer 300.

The processor 320 may be configured to execute instructions stored by the memory 310 and/or process signals received from the keyboard 240 and numeric keypad 250 relating to an actuation of one of the at least one macro keys 230. The computer program to be detected by the computer driver 330 may be any program that is executable by the processor 320. The computer program may be a file editor and/or a computer-aided drawing, CAD, program and/or an internet browser and/or a video game and/or a computer repair tool and/or any program executable by the processor 320.

In this example, the computer driver 330 is configured to detect a computer program being at least partially resident in the memory 310. The computer driver 330 also assigns at least one computer macro relating to the detected computer program to a key on the keyboard 240 and/or numeric keypad 250. The computer driver 330 additionally assigns a computer macro symbol 215 relating to the assigned computer macro. Furthermore, the computer driver 330, via the computer screen 200, displays the OSD taskbar 210, wherein the OSD taskbar 210 is configured to display the assigned stored computer macro symbol 215 and a reference relating to the stored key on the keyboard 240 and/or the numeric keypad 250 to which the assigned stored computer macro has been assigned. In some examples, a plurality of computer macros are assigned by the computer driver 330. In some examples, the key on the keyboard 240 and/or numeric keypad assigned to a computer macro may be automatically assigned by the computer driver 330 upon startup of the computer program. In some examples, the computer driver 330 may automatically assign computer macros and/or computer macro symbols 215 and/or keys on the keyboard 240 and/or numeric keypad 250 to which the computer macros are assigned. In some examples, if the computer macro is altered, the computer driver 330 automatically alters the computer macro symbol 215 to a computer macro symbol 215 related to the altered computer macro. In some examples, the computer driver 330 may offer preset positions of the OSD for the user to choose from. These presets may be presented within the detected computer program and/or via a configuration tool. In some examples, the computer macro may only be used in the detected computer program and no other computer programs detectable by the computer driver 330. In some examples, the computer driver 330 is configured to alter the functioning of at least one of the macro keys 230 dependent on the currently detected computer program. For example, a macro key 230 may center a line of text when a file editor program is detected and then the same macro key 230 may be a "create line" macro when a CAD program is detected.

In some examples, the memory 310 and processor 320 are configured to periodically communicate with a cloud storage medium and store the key and/or button on the peripheral device assigned to the computer macro and/or the assigned computer macro symbol and/or the computer macro and/or the assigned computer macro symbol themselves in the cloud storage medium. This may allow for the assigned computer macros, the assigned computer macro symbols and the keys and/or buttons of the peripheral device to which the computer macros and computer macro symbols are assigned to be stored in the cloud, thereby allowing for the assignments to be maintained if the peripheral device is transferred to a second computer. This may allow for a user to maintain their customized computer macros across devices. The user may access the cloud stored computer macros, computer macro symbols and keys and/or buttons via a user account on a website. The computer driver 330 and/or processor 320 and/or memory 310 may also be coupled to this same account for easy storage and/or retrieval of the computer macros, computer macro symbols and keys and/or buttons on a second computer.

A method of the computer driver 330 detecting a computer program, retrieving a computer macro, retrieving a computer macro symbol and displaying the retrieved computer macro symbol 215 is described in more detail below.

In some examples, the computer 300 further comprises a USB interface 340 for USB devices to be coupled to the computer 300. USB devices may be, for example, keyboards 240, numeric keypads 250, mice, microphones or any other USB compatible device. In some examples, the computer 300 further comprises a transceiver 350 for Bluetooth devices to be coupled to the computer 300. Bluetooth devices may be, for example, keyboards 240, numeric keypads 250, mice, microphones, headphones or any other Bluetooth compatible device. In some examples, the computer 300 further comprises an HDMI/DVI/D-SUB interface 360 for HDMI/DVI/D-SUB compatible devices, such as monitors, to be coupled to the computer 300. Each of the USB interface 340, the transceiver 350 and the HDMI/DVI/D-SUB interface 360 may be coupled to the computer driver 330. This may then allow for the computer driver 330, the memory 310 and the processor 320 to interact with the peripheral devices as described in the present disclosure.

In some examples, the keyboard 240 and/or the numeric keypad 250 also comprise a transceiver. In a particular example, the keyboard 240 is configured to be coupled to the computer 300 via the USB interface 340 and further comprises a transceiver. The numeric keypad 250 comprises a transceiver of its own which is configured to communicate wirelessly with the transceiver in the keyboard 240, wherein an input to the numeric keypad 250 is communicated to the computer 300 via the wired coupling of the keyboard 240 to the computer 300. This may then lead to a numeric keypad 250 which comprises no wired coupling to the computer 300, thereby leading to the numeric keypad 250 being able to be placed in a user's preferred position, leading to a more efficient working method for the user and a customizable peripheral device setup. Alternatively, the previously described example may work in the reverse i.e. the numerical keypad 250 is configured to be coupled to the computer 300 via the USB interface 340 and the keyboard 240 comprises no wired coupling to the computer 300.

The computer 300 may additionally or alternatively comprise other interfaces suitable for coupling further peripheral devices to the computer 300. In some examples, the keyboard 240 and/or the numeric keypad 250 are integral to the computer 300 i.e. in a laptop-like configuration.

Figure 4:
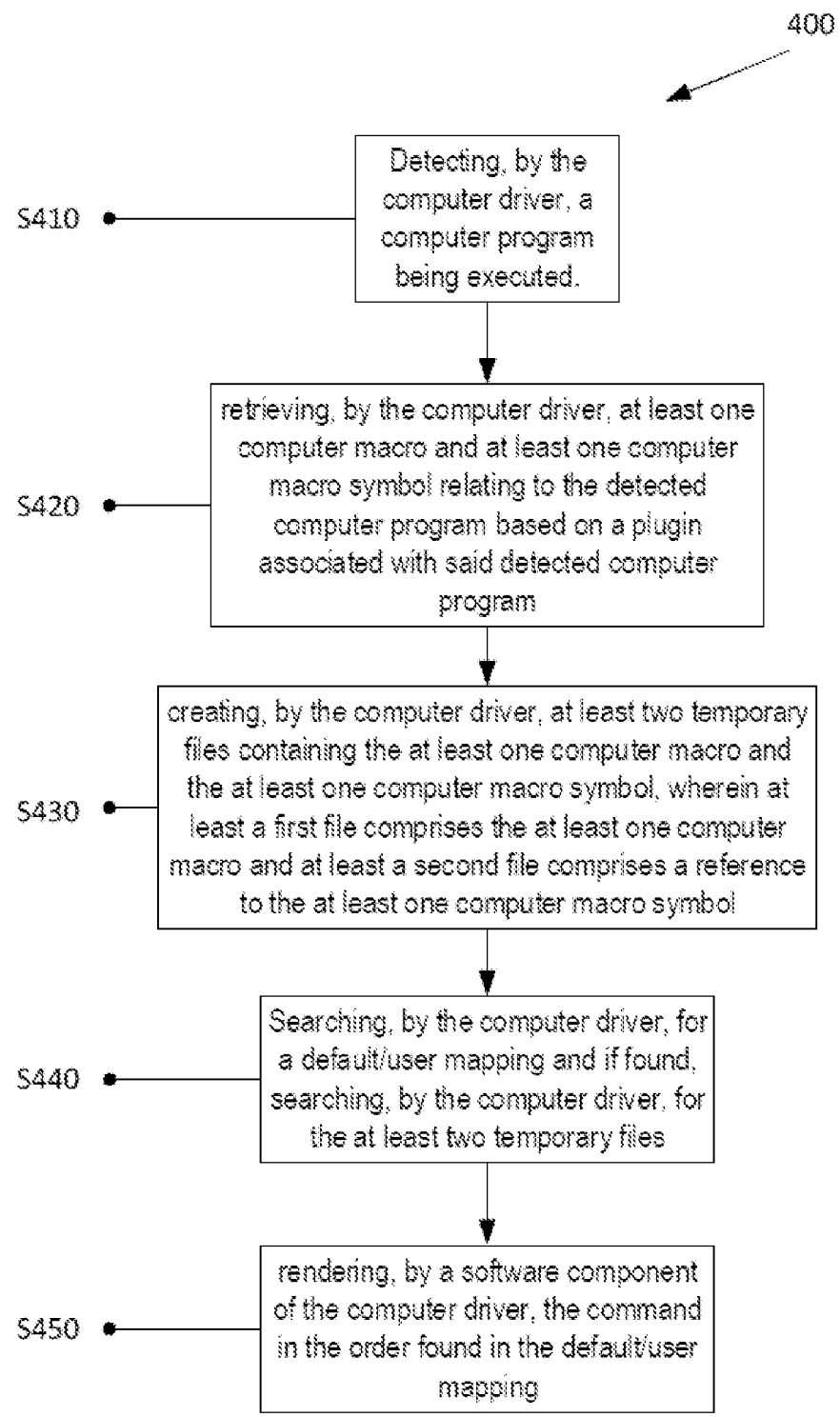
FIG. 4 shows a flow diagram of a method of retrieving computer macros and computer macro symbols according to some examples as described herein.

FIG. 4 shows a flow diagram of a method of retrieving computer macros and computer macro symbols according to some examples as described herein. More specifically, FIG. 4 shows a method of retrieving a computer macro, retrieving a computer macro symbol and displaying the retrieved computer macro symbol 215.

The method 400 begins by detecting S410, by the computer driver 330, a computer program being run by a user of the computer 300 on the computer 300 i.e. being executed by the computer 300. In some examples, there are multiple computer programs running simultaneously and the computer driver 330 is configured to detect only the computer program currently being used by the user i.e. the computer program currently in focus on the computer. The computer program may be detected by the computer driver 330 inspecting an .exe and/or a .dll file at least partially stored within the memory 310 of the computer 300. The computer driver 330 may be able to derive the name of the computer program being run based upon an inspected file. The name of the computer program may then be stored via the memory 310 of the computer 300. In some examples, in order to store information about the detected computer program and/or the assigned computer macro and/or the assigned computer macro symbol and/or the key on the keyboard 240 and/or numeric keypad to which the computer macro is assigned, the computer driver 330 may create a file and/or a folder in the memory 310. The detected computer program may be at least one of a Microsoft Office program, an Adobe program, a computer-aided design, CAD, program, a Windows Pre-Installation Environment program and an Internet browser. In some examples, the computer driver may then search for a default/user mapping of the computer program in focus in a folder of the driver. A default/user mapping may be defined as a default set of computer macros and computer macro symbols and/or a set of computer macros and computer macro symbols defined by a user.

After detecting S410 the computer program, the computer driver 330 then retrieves S420 at least one computer macro and at least one computer macro symbol 215 relating to the detected computer program based on a plugin associated with the detected computer program. The plugin may be at least partially embedded in the computer program and/or at least partially external to the computer program. The at least one computer macro and at least one computer macro symbol 215 may be retrieved by the computer driver executing the plugin and the plugin sending the computer macro and the computer macro symbol 215 to the computer driver. In some examples, the computer driver 330 automatically assigns at least one of the retrieved computer macros to at least one of the macro keys 230 on the keyboard 240 and/or the numeric keypad 250. In some examples, the computer driver 330 searches through at least one .exe and/or .dll file of the detected computer program to search for at least one computer macro. The computer driver 330 may then collate a list of the computer macros found and provide them for use. In some examples, the computer driver 330 automatically assigns at least one of the found computer macros to at least one of the macro keys 230 on the keyboard 240 and/or the numeric keypad 250. In some examples, this automatically assigned computer macro is the first computer macro found by the computer driver 330 during the search. Information about a most commonly used computer macro may be stored in a .dll file of the detected computer program and/or the computer driver may download, to the memory 310, via a coupling to the Internet, a list of most commonly used computer macros in the detected computer program.

After retrieving S420 the at least one computer macro and the at least one computer macro symbol 215, the computer driver 330 then creates S430 at least two temporary files containing the at least one computer macro and the at least one computer macro symbol 215, wherein at least a first file comprises the at least one computer macro and at least a second file comprises a reference to the at least one computer macro symbol 215. The computer driver 330 may create S430 the at least two temporary files after the retrieval S420 of the at least one computer macro and at least one computer macro symbol 215 or, alternatively, at the same time as the retrieval S420 of the at least one computer macro and at least one computer macro symbol 215. The computer driver 300 may search at least one .exe and/or .dll file of the detected computer program to search for the at least one computer macro symbol 215. The computer driver 330 may then collate a list of the computer macro symbols 215 found and provide them for a user to use. In some examples, the computer driver 330 automatically assigns a found computer macro symbol 215 to its respective computer macro and provides this combination for use by the user. In some examples, the computer driver 330 does not automatically assign the found computer macro symbol 215 to its respective computer macro and provides the user with a choice, via a popup window and/or via the configuration tool, of which computer macro symbol is to be assigned to a respective computer macro. The computer driver 330 may then sort the computer macros and computer macro symbols 215 into the at least two temporary files.

In some examples, such as in an Internet browser, there are no computer macros nor computer macro symbols 215. In this case, the computer driver 330 may recognize that the detected computer program is an Internet browser and use well known websites, such as YouTube and Wikipedia, as macros instead. The well known websites may be detected via the plugin related to the Internet browser. The computer macro symbols 215 may relate to the website i.e. be a website logo. The computer driver 330 may also via the memory 310 and/or via the Internet, display computer macro symbols 215 relating to these websites. In some examples, the computer driver 330 is configured to recognize a most visited website by a user and use this website as a computer macro. In some examples, if a most visited website changes, the computer driver 330 is configured to replace the previously most visited website with the newly most visited website. If a website is used, when the user actuates the macro key 230 associated with the computer macro, the memory 310, the processor 320 and the computer driver 330 may work together to launch the website associated with the actuated key. In some examples, after creating S430 the at least two temporary files, the computer driver searches S440 for a default/user mapping and if found, the computer driver searches S440 for the at least two temporary files.

If the at least two temporary files are found, the computer driver 330 is then configured to render S450, by a software component of the computer driver, the command in the order found in the default/user mapping. In some examples, the retrieved computer macro and its respective computer macro symbol are then displayed on the OSD taskbar 210 in a configuration described in the present disclosure. In some examples, only the retrieved computer macro symbol 215 is displayed on the OSD taskbar 210 in a configuration described in the present disclosure. In some examples, the OSD taskbar 210 is further configured to display an alphanumeric text string that relates to the computer macro. The alphanumeric text string may located above and/or below and/or one side of the computer macro symbol 215 or alternatively, be displayed instead of the computer macro symbol 215.

In some examples, the computer driver 330 is further configured to retrieve a symbol relating to the detected computer program. The symbol may be a symbol that is used on a computer desktop for the detected computer program. This may allow for the user to easily identify which program the currently displayed computer macros and/or computer macro symbols relate to. The computer driver 330 may do this by retrieving the symbol using the same method as described above in relation to the retrieval S420 of the at least one computer macro and the at least one computer macro symbol 215. This symbol may be displayed in addition to the computer macro symbols 215 displayed on the OSD taskbar 210 as described in the present disclosure or may replace one of the computer macro symbols 215.

Figure 5:
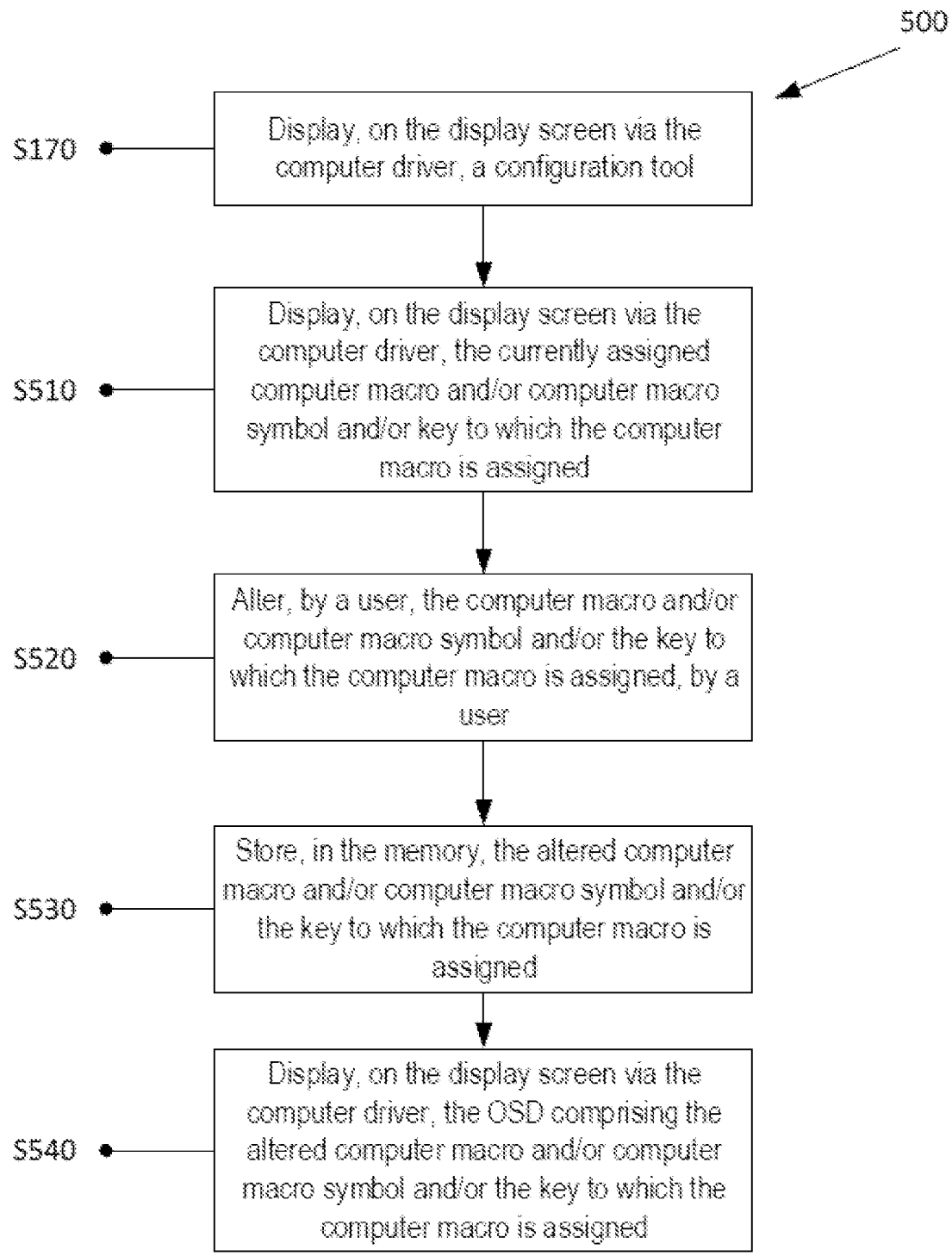
FIG. 5 shows a flow diagram of a method of altering a computer macro according to some examples as described herein.

FIG. 5 shows a flow diagram of a method of altering a computer macro according to some examples as described herein.

FIG. 5 shows a flow diagram of a method of altering a computer macro and/or a computer macro symbol and/or a key to which a computer macro is assigned to.

The method 500 begins with displaying S170, on the display screen 200 via the computer driver 330. The configuration tool may then be configured to display S510 the currently assigned computer macro and/or the currently assigned computer macro 215 symbol and/or the key on the keyboard 240 and/or numeric keypad 250 to which the computer macro is currently assigned. The configuration tool is further configured to allow a user to alter S520 the assigned computer macro and/or assigned computer macro symbol 215 and/or key on the keyboard 240 and/or numeric keypad 250 to which the computer macro is assigned.

The configuration tool may allow a user to change the computer macro from an automatically assigned computer macro to a computer macro which may fit the user's preference in a more efficient manner. A user may be able to alter the computer macro from, for example, a computer macro of the bolding of a text element to a computer macro for underlining a text element. In some examples, the user may also be able to alter the computer macro symbol 215 assigned to the computer macro. In some examples, the user may be able to alter the computer macro symbol 215 to a symbol already present in the detected computer program. In some examples, the user may be able to alter the computer macro symbol 215 to a symbol used in a computer program different from the detected computer program. In some examples, the user may be able to alter the computer macro symbol 215 to a bespoke symbol such as, for example, a symbol downloaded from the internet and/or an alphanumeric element indicating the computer macro and/or a pre-stored image stored in the memory and/or any other suitable method of indicating the computer macro. The key on the keyboard 240 and/or numerical keypad 250 may be any key such as, for example, a function key, an alphanumeric key or a bespoke key on the keyboard 240 and/or numerical keypad 250.

In some examples, the configuration tool is configured to display a user interface configured to allow the user to select the computer macro and/or the computer macro symbol 215 and/or the key on the keyboard 240 and/or numerical keypad 250 and alter the computer macro and/or computer macro symbol 215 and/or key on the keyboard 240 and/or numerical keypad 250 according to the user's preferences.

The user interface may comprise a table and/or a set of drop-down menus to alter at least one computer macro for a detected computer program and/or at least one computer macro symbol 215 assigned to the at least one computer macro and/or a key assigned to the at least one computer macro. The configuration tool may comprise a set of computer macros which are available from the macros within the detected computer program, wherein the macros are retrieved by the method described above in relation to FIG. 4. The configuration tool may also comprise a set of computer macro symbols 215 which are available from the macro symbols 215 within the detected computer program, wherein the macro symbols 215 are retrieved by the method described above in relation to FIG. 4. In some examples, the configuration tool may also show at least one image/symbol which has been downloaded from the Internet. In some examples, the configuration tool is configured to allow a user to input a custom alphanumeric text string for representing the computer macro. This may allow for the user to customize the OSD taskbar 210 in a personal manner. In some examples, the user interface is at least partially voice controlled. For example, a user may use their voice to select a key assigned to the at least one computer macro and then select a new computer macro to be assigned to that key via their voice. The user may then confirm or deny this alteration via their voice. The user may be able to do this via a microphone coupled to, or integral to, the computer 300.

After the alteration S520 of the computer macro and/or computer macro symbol 215 and/or key to which the computer macro has been assigned, the memory 310 may then store S530 the altered computer macro and/or computer macro symbol 215 and/or key to which the computer macro has been assigned by overwriting the previously stored data. After these choices have been stored S530, the computer driver 330 may then be configured to display, via the display screen 200, the OSD taskbar 210 which comprises the altered computer macro symbol 215 and/or key to which the computer macro has been assigned and any computer macro symbol 215 and/or key to which the computer macro has been assigned should they not have been altered within the configuration tool.

The variants described above are merely intended to provide a better understanding of the structure, the mode of operation and the properties; they do not limit the disclosure to the embodiments. The Figures are partly schematic, with essential properties and effects being shown partly enlarged in order to clarify the functions, operating principles, technical concepts and features. In this context, each mode of operation, each principle, each technical concept and each feature disclosed in the Figures or in the text can be combined with all claims, each feature in the text and in the other Figs, other functionalities, principles, technical features and characteristics contained in or resulting from this disclosure, so that all conceivable combinations can be attributed to the described solutions. Combinations between all individual embodiments in the text, i.e. in each section of the description, in the claims and also combinations between different variants in the text, in the claims and in the Figures are also included.

Also, the claims do not limit the disclosure and thus the combination possibilities of all disclosed features among each other. All disclosed features are explicitly disclosed both individually and in combination with all other features herein. Many other effective alternatives will occur to the skilled person. It will be understood that the solution is not limited to the described embodiments and encompasses modifications apparent to those skilled in the art and lying within the scope of the claims appended hereto.

The invention claimed is:

1. A method for creating a computer macro, the computer macro being executed on a computer, the computer including a processor, a display screen, a peripheral device, and a memory accessible by the processor, peripheral device, the method comprising:

detecting, by a computer driver being at least partially resident in the memory, a computer program being at least partially resident in the memory to be executed in the computer;

assigning, by the computer driver, at least one computer macro relating to the detected computer program to a key and/or button on the peripheral device;

assigning, by the computer driver, a computer macro symbol relating to the assigned computer macro;

storing, in the memory, the computer macro, the key and/or button on the peripheral device assigned to the computer macro and/or the assigned computer macro symbol;

displaying, on the display screen via the computer driver, an on-screen-display, OSD, wherein the OSD is configured to display the assigned stored computer macro symbol and a reference relating to the stored key and/or button on the peripheral device to which the assigned stored computer macro has been assigned; and executing, by the processor, the stored computer macro assigned to the stored computer macro in the computer program when the stored key and/or button on the peripheral device is actuated.

2. The method as claimed in claim 1, further comprising displaying, on the screen via the computer driver, a configuration tool configured to display the assigned computer macro and/or the assigned computer macro symbol relating to the detected computer program, and the key and/or button on the peripheral device to which the computer macro is assigned, wherein the configuration tool is further configured to allow a user to alter the key and/or button on the peripheral device to which the computer macro is assigned; and/or wherein the key and/or button on the peripheral device is a key and/or button used only for the assigned computer macro; and/or wherein the key and/or button on the peripheral device is a key and/or button separate from an existing function key or an alphanumeric key on the peripheral device; and/or wherein the computer program is at least one of Pre-Installation Environment program; and an Internet browser; and/or wherein the OSD is integrated into a desktop taskbar, and/or wherein the OSD is further configured to display a computer program symbol relating to the detected computer program and/or the computer program to which the computer macro displayed on the OSD is assigned to; and/or wherein the OSD is configured to display the stored key and/or button on the peripheral device in a layout same to a layout of the stored key and/or button on the peripheral device as seen from a user's perspective.

3. The method as claimed in claim 1, wherein the method comprises:

assigning, by the computer driver, a plurality of computer macros;

assigning, by the computer driver, a plurality of computer macro symbols relating to the plurality of computer macros;

storing, in the memory, the plurality of the computer macros, a plurality of keys and/or buttons on the peripheral device assigned to the plurality of computer macros and/or the plurality of assigned computer macro symbols; and displaying, on the display screen via the computer driver, the OSD, wherein the OSD is configured to display the plurality of assigned stored computer macro symbols and a plurality of references relating to the plurality of stored keys and/or buttons on the peripheral device to which the plurality of assigned stored computer macros have been assigned.

4. The method as claimed in claim 3, wherein the OSD is configured to display the plurality of assigned stored computer macro symbols and the plurality of references relating to the plurality of stored keys and/or buttons on the peripheral device to which the plurality of assigned stored computer macros have been assigned in groups, wherein the groups relate to the layout of the plurality of the stored keys and/or buttons on the peripheral device as seen from a user's perspective.

5. The method as claimed in claim 4, wherein the peripheral device is a keyboard and/or numeric keypad, wherein there are twelve assigned stored computer macro symbols and twelve references relating to the twelve stored keys on the keyboard and/or the numeric keypad to which the twelve assigned stored computer macros, and wherein the twelve assigned stored computer macro symbols and twelve references are configured to be displayed on the OSD in three groups of four.

6. The method as claimed in claim 5, wherein the OSD is configured to display a thirteenth computer macro symbol, wherein the thirteenth computer program symbol relates to the detected computer program and/or the computer program to which the computer macro displayed on the OSD is assigned to.

7. The method as claimed in claim 3, wherein the peripheral device is a keyboard and/or numeric keypad, wherein there are four assigned stored computer macro symbols and four references relating to the four stored keys on the keyboard and/or the numeric keypad to which the four assigned stored computer macros, and wherein the four assigned stored computer macro symbols and four references are configured to be displayed on the OSD in one group of four.

8. The method as claimed in claim 7, wherein the OSD is configured to display a fifth computer macro symbol, wherein the fifth computer program symbol relates to the detected computer program and/or the computer program to which the computer macro displayed on the OSD is assigned to.

9. The method as claimed in claim 3, wherein there is a plurality of peripheral devices comprising at least a keyboard and a numeric keypad, wherein there are sixteen assigned stored computer macro symbols and sixteen references relating to the sixteen stored keys on the keyboard and/or the numeric keypad to which the sixteen assigned stored computer macros, and wherein the sixteen assigned stored computer macro symbols and sixteen references are configured to be displayed on the OSD in four groups of four.

10. The method as claimed in claim 1, wherein the assigned computer macro is unique to the detected computer program.

11. A computer program, at least partially resident in a memory, comprising a computer driver for creating a computer macro, wherein the computer product comprises instructions which, when the program is carried out by a computer, cause the computer to carry out:

detecting a computer program;
assigning a computer macro relating to the computer program to a key and/or button on a peripheral device;
assigning a computer macro symbol relating to the assigned computer macro; and
displaying, on a screen, an on screen display, OSD, configured to display the assigned computer macro symbol and a reference to the key and/or button on the peripheral device to which the assigned computer macro has been assigned.

12. The computer program as claimed in claim 11, further configured to display, on the screen, a configuration tool, wherein the configuration tool is configured to display the assigned computer macro and/or the assigned computer macro symbol, and the key and/or button on the peripheral device to which the computer macro is assigned, wherein the configuration tool is further configured to allow a user to alter the assigned computer macro and/or the assigned computer macro symbol and/or the key and/or button on the peripheral device to which the computer macro is assigned, and/or wherein the computer macro symbol is a symbol used in the detected computer program for the assigned computer macro; and/or
wherein the computer driver is configured to detect the computer program by:
detecting, by the computer driver, the executed computer program;
detecting, by the computer driver, the computer program in focus;
searching, by the computer driver, for a default/user mapping of the computer program in focus in a folder of the driver; if the computer program in focus comprises a plugin for exporting a computer macro and a computer macro symbol relating to the computer program, executing, by the computer driver, the plugin and sending, by the plugin, the computer macro and the computer macro symbol to the computer driver; creating, by the computer driver, at least two temporary files containing the computer macro and the computer macro symbol, wherein at least a first file comprises the computer macro and at least a second file comprises a reference to the computer macro symbol;
if a default/user mapping is found by the computer driver, searching, by the computer driver, for the at least two temporary files; and
if the at least two temporary files are found, rendering, by a software component of the computer driver, the computer macro found in the default/user mapping.

13. A computer macro creation system comprising:
a computer driver configured to carry out the method as claimed in claim 1, and
a peripheral device, wherein the peripheral device further comprises the processor, wherein the memory is configured to store the computer driver, and wherein the processor is configured to execute a driver instruction from the memory.

14. A data processing system comprising means for carrying out the method of claim 1.

15. A computer-readable storage medium comprising instructions which, when executed by a computer, cause the computer to carry out the method of claim 1.

* * * * *